(12) United States Patent
Homma et al.

(10) Patent No.: US 9,991,557 B2
(45) Date of Patent: Jun. 5, 2018

(54) COMPOSITE SOLID ELECTROLYTE AND ALL SOLID BATTERY

(71) Applicant: FUJITSU LIMITED, Kawasaki-shi, Kanagawa (JP)

(72) Inventors: Kenji Homma, Atsugi (JP); Tamotsu Yamamoto, Tachikawa (JP); Satoru Watanabe, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days. days.

(21) Appl. No.: 15/238,992

(22) Filed: Aug. 17, 2016

(65) Prior Publication Data

US 2016/0359192 A1 Dec. 8, 2016

Related U.S. Application Data

(63) Continuation of application No. PCT/JP2014/056355, filed on Mar. 11, 2014.

(51) Int. Cl.
*H01M 10/0525* (2010.01)
*H01M 10/0562* (2010.01)
*H01G 9/00* (2006.01)

(52) U.S. Cl.
CPC ... *H01M 10/0562* (2013.01); *H01M 10/0525* (2013.01); *H01G 9/0036* (2013.01); *H01M 2300/002* (2013.01); *H01M 2300/008* (2013.01); *H01M 2300/0068* (2013.01); *H01M 2300/0071* (2013.01); *H01M 2300/0077* (2013.01); *H01M 2300/0091* (2013.01)

(58) Field of Classification Search
None
See application file for complete search history.

(56) References Cited

U.S. PATENT DOCUMENTS

| | | | | |
|---|---|---|---|---|
| 5,695,873 A | * | 12/1997 | Kumar | H01M 10/052 252/62.2 |
| 2009/0092903 A1 | * | 4/2009 | Johnson | H01M 4/0471 429/322 |
| 2013/0230778 A1 | * | 9/2013 | Saimen | H01M 10/056 429/303 |

(Continued)

FOREIGN PATENT DOCUMENTS

| | | |
|---|---|---|
| JP | 2009-215130 A1 | 9/2009 |
| JP | 2010-143785 A1 | 7/2010 |

(Continued)

OTHER PUBLICATIONS

Kokal, Solid state electrolytes for all-solid-state 3D lithium-ion batteries, Jan. 1, 2012, DOI: http://dx.doi.org/10.6100/IR738959.*

(Continued)

*Primary Examiner* — Ula C Ruddock
*Assistant Examiner* — Anna Korovina
(74) *Attorney, Agent, or Firm* — Kratz, Quintos & Hanson, LLP

(57) ABSTRACT

A composite solid electrolyte, which includes a solid electrolyte containing $LaF_3$, and solid electrolyte particles, which are either $Li_{3x}La_{2/3-x}TiO_3$ ($0 \leq x \leq 1/6$) or $Li_7La_3Zr_2O_{12}$ connected via the solid electrolyte.

5 Claims, 6 Drawing Sheets

(56) References Cited

U.S. PATENT DOCUMENTS

2014/0193695 A1* 7/2014 Hoshina ............... H01M 4/485
                                                      429/156

FOREIGN PATENT DOCUMENTS

| JP | 2010-202499 A1 | 9/2010 |
| JP | 2011-119158 A1 | 6/2011 |
| JP | 2013-30336 A1 | 2/2013 |
| JP | 2013-229132 A1 | 11/2013 |
| WO | WO 2013/136446 A1 | 9/2013 |

OTHER PUBLICATIONS

Yang et al., Six-Membered-Ring Malonatoborate-Based Lithium Salts as Electrolytes for Lithium Ion Batteries, ECS Transactions, 33 (39) 57-69 (2011), 10.1149/1.3589921.*

International Search Report for International Application No. PCT/JP2014/056355 dated May 20, 2014.

Written Opinion of the the International Searching Authority for International Application No. PCT/JP2014/056355 (5 Sheets total, 2 Sheets translation) dated May 20, 2014.

* cited by examiner

COMPOSITE SOLID ELECTROLYTE AND ALL SOLID BATTERY

CROSS-REFERENCE TO RELATED APPLICATION

This application is a continuation application of International Application PCT/JP2014/056355 filed on Mar. 11, 2014 and designated the U.S., the entire contents of which are incorporated herein by reference.

FIELD

The embodiments discussed herein relate to a composite solid electrolyte and an all solid battery.

BACKGROUND

To develop energy harvesting technologies where electricity generated from small energy, such as sun light, vibrations, and body temperatures of human and animals, is stored to utilize for a power of sensors or wireless transmission, secondary batteries having high safety and reliability under various global environments are important.

As the secondary battery, a liquid-based battery using a liquid-based electrolyte is currently widely used.

The liquid-based battery however has a problem that a cathode active material is deteriorated to reduce a capacity of the battery, as a charging cycle is repeated, and a problem that short-circuit of the battery caused by a formation of dendrite may cause ignition of the organic electrolytic solution within the battery.

Therefore, the liquid-based battery lacks safety and reliability to be used for an energy harvesting device, a service life of which is expected to be 10 years or longer.

Accordingly, all solid batteries, all of constituting materials of which are solids, have been attracted attentions as the secondary battery having high safety and reliability. Advantages of the all solid battery are being free from leakage of a liquid and ignition, and having excellent cycle properties.

A solid electrolyte layer is used in the all solid battery. The solid electrolyte layer is typically obtained by compression-molding solid electrolyte particles, followed by firing. As the solid electrolyte particles, $Li_{3x}La_{2/3-x}TiO_3$ (0≤x ≤⅙) (LLTO) and $Li_7La_3Zr_2O_{12}$ (LLZO) are known to be materials having high lithium ion conductivity.

Although the solid electrolyte particles have excellent lithium ion conductivity within the particles, the resistance between the particles is significantly large compared to the resistance within the particle. Therefore, it is difficult to use the solid electrolyte particles as the solid electrolyte layer, as it is, even after the compression-molding of the solid electrolyte particles. In order to reduce the resistance between the particles, firing is performed after the compression molding. The firing is typically carried out at 1,000° C. or higher. To perform the firing has problems that costs for electricity and facilities are high.

In the case where an all solid battery is produced, moreover, it is effective to perform so-called integrated sintering, where sintering is performed with a cathode, a solid electrolyte, and an anode being in a combined state to reduce interface resistance between the electrolyte and the electrode. In the case where the LLTO and the LLZO are used as solid electrolytes, however, the integrated sintering needs to be performed at the sintering temperature of 1,250° C. or higher. Accordingly, the cathode and the anode, which do not cause melting or decomposition at a temperature of 1,250° C. or higher, need to be used, and thus there is a problem that a selection of materials for the cathode and anode is small.

Accordingly, various researches have been conducted to improve lithium ion conductivity of a solid electrolyte without firing.

For example, proposed is a lithium ion conductor, in which a hollow inorganic porous body is filled with an ionic liquid containing a lithium salt (see, for example, Japanese Patent Application Laid-Open (JP-A) No. 2013-30336). Moreover, a solid ion conductor containing an ordinary temperature molten salt and insulating inorganic particles is proposed (see, for example, JP-A No. 2011-119158).

In the proposed techniques, however, there is a possibility that the ionic liquid (the ordinary temperature molten salt) is leaked from the solid electrolyte under a high temperature environment, because the ionic liquid (the ordinary temperature molten salt) is used, and there is a problem in safety.

Moreover, proposed is electrolyte particles obtained by mechanically mixing electrolytic raw material crystal particles having lithium ion conductivity, and a lithium salt to cause distortion of the crystalline structure of the raw material crystal particles (see, for example, JP-A No. 2009-215130).

However, even the proposed technique has not attained sufficiently high lithium ion conductivity.

Accordingly, there is currently a need for a solid electrolyte, which excels in safety and reliability, can be produced at a low temperature, and has high lithium ion conductivity, as well as an all solid battery, which excels in safety and reliability, can be produced at a low temperature, and can achieve high output.

SUMMARY

The disclosed composite solid electrolyte includes a solid electrolyte containing $LaF_3$, and solid electrolyte particles which are either $Li_{3x}La_{2/3-x}TiO_3$ (0≤x≤⅙) or $Li_7La_3Zr_2O_{12}$ connected via the solid electrolyte.

The disclosed all solid battery includes a cathode active material layer, an anode active material layer, and a solid electrolyte layer sandwiched between the cathode active material layer and the anode active material layer, where the solid electrolyte layer is the disclosed composite solid electrolyte in the form of a layer.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Composite Solid Electrolyte

Figure 1:
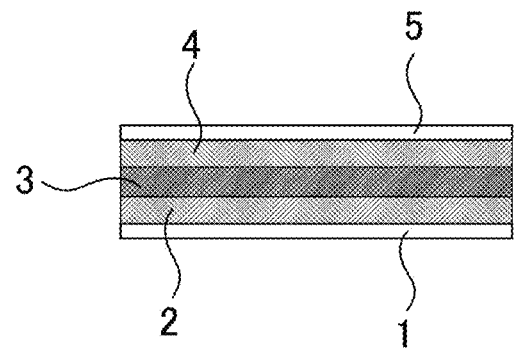
FIG. 1 is a schematic cross-sectional view illustrating one example of the all solid battery.

The disclosed composite solid electrolyte includes at least a solid electrolyte and solid electrolyte particles, and may further include other ingredients according to the necessity.

Solid Electrolyte

The solid electrolyte is not particularly limited, and may be appropriately selected depending on the intended purpose, expect that the solid electrolyte contains $LaF_3$. The solid electrolyte is preferably a solid solution of $LaF_3$ and LiF because of excellent ionic conductivity.

Solid Electrolyte Particles

The solid electrolyte particles are either $Li_{3x}La_{2/3-x}TiO_3$ ($0 \leq x \leq \frac{1}{6}$) or $Li_7La_3Zr_2O_{12}$. The solid electrolyte particles are preferably $Li_{0.33}La_{0.55}TiO_3$ because of excellent ionic conductivity.

Since a plurality of the solid electrolyte particles are connected via the solid electrolyte containing the $LaF_3$, the resistance between a plurality of the solid electrolyte reduces, to thereby obtain a composite solid electrolyte having excellent ionic conductivity.

An interface between the solid electrolyte particle and the solid electrolyte may not be clearly confirmed. Even when an interface between the solid electrolyte particle and the solid electrolyte cannot be clearly confirmed by observing under a scanning electron microscope, the presence of the solid electrolyte particles and the solid electrolyte can be confirmed by performing mapping of fluorine, for example, using a scanning electron microscope and an attached energy dispersive X-ray detector.

Moreover, the composite solid electrolyte may contain another layer between the solid electrolyte particles and the solid electrolyte. Examples of a material of the another layer include a material, in which part of oxygen bonded to Ti or Zr, which is a metal constituting $Li_{3x}La_{2/3-x}TiO_3$ ($0 \leq x \leq \frac{1}{6}$) or $Li_7La_3Zr_2O_{12}$, is substituted with fluorine in $Li_{3x}La_{2/3-x}TiO_3$ ($\leq x \leq \frac{1}{6}$) or $Li_7La_3Zr_2O_{12}$.

A shape and size of the composite solid electrolyte are not particularly limited, and may be appropriately selected depending on the intended purpose. For example, the composite solid electrolyte may be in the form of a layer or granules. The composite solid electrolyte in the form of a layer may be produced, and the produced composite solid electrolyte may be used as it is as a solid electrolyte layer of an all solid battery. Alternatively, the composite solid electrolyte in the form of granules may be produced, and the produced composite solid electrolyte is formed into a layer through compression molding at the time when an all solid battery is produced, and a resulting composite solid electrolyte may be used as a solid electrolyte layer of the all solid battery.

A production method of the composite solid electrolyte is not particularly limited, and may be appropriately selected depending on the intended purpose, but the following production method is preferable.

Production Method of Composite Solid Electrolyte

A production method of the disclosed composite solid electrolyte includes at least a heating step, and may further include other steps according to the necessity.

Heating Step

The heating step is heating a mixture, which has been obtained by mixing solid electrolyte particles and a fluorine-containing lithium salt, at a temperature equal to or higher than a decomposition temperature of the fluorine-containing lithium salt.

A temperature for the heating in the heating step is not particularly limited, and may be appropriately selected depending on the intended purpose, except that the temperature is equal to or higher than the decomposition temperature of the fluorine-containing lithium salt. The upper limit of the temperature for the heating is not particularly limited, and may be appropriately selected depending on the intended purpose. Considering the points that a production method of the disclosed composite solid electrolyte does not require a high temperature compared to a temperature for sintering the solid electrolyte particles, and a solid electrolyte having excellent ionic conductivity is obtained, the temperature for the heating is preferably 700° C. or lower, more preferably 500° C. or lower. The heating temperature of 500° C. or lower is advantageous because a selection of materials for a cathode and an anode are widened when an all solid battery is produced by heating a cathode, a solid electrolyte, and an anode in an integrated state.

As the heating step is performed, the solid electrolyte particles and the fluorine-containing lithium salt are reacted when the fluorine-containing lithium salt is decomposed. As a result, a modified layer, which is a solid electrolyte containing $LaF_3$, is formed on surfaces of the solid electrolyte particles. The solid electrolyte particles are connected via the modified layers. Since the modified layer is also a solid electrolyte, resistance between the solid electrolyte particles reduces to thereby obtain a solid electrolyte having excellent ionic conductivity. Moreover, the heating step can be performed at a temperature equal to or higher than a decomposition temperature of the fluorine-containing lithium salt, hence the heating step can be performed without a high temperature, such as a sintering temperature (e.g., about 1,200° C.) of the solid electrolyte particles. Accordingly, the composite solid electrolyte can be produced at a low temperature.

Solid Electrolyte Particles

The solid electrolyte particles are either $Li_{3x}La_{2/3-x}TiO_3$ ($0 \leq x \leq \frac{1}{6}$) or $Li_7La_3Zr_2O_{12}$, and are preferably $Li_{0.33}La_{0.55}TiO_3$.

Fluorine-Containing Lithium Salt

The fluorine-containing lithium salt is not particularly limited, and may be appropriately selected depending on the intended purpose. Examples of the fluorine-containing lithium salt include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiXF_y$, (where X is P, As, Sb, B, Bi, Al, Ga, or In, y is 6 when X is P, As, or Sb, and y is 4 when X is B, Bi, Al, Ga, or In), lithium perfluoroalkylsulfonic acid imide $LiN(C_mF_{2m+1}SO_2)(C_nF_{2n+1}SO_2)$ (where m and n are each independently an integer of 1 to 4), and lithium perfluoroalkylsulfonic acid methide $LiC(C_pF_{2p+1}SO_2)(C_qF_{2q+1}SO_2)(C_rF_{2r+1}SO_2)$ (where p, q, and r are each independently an integer of 1 to 4). Among them, $LiBF_4$ is preferable because a decomposition temperature is low.

Mixing

A method and conditions of the mixing are not particularly limited, and may be appropriately selected depending on the intended purpose.

In the heating step, the solid electrolyte particles and the fluorine-containing lithium salt are preferably mixed at a mass ratio (solid electrolyte particles:fluorine-containing lithium salt) of 50:50 to 95:5, and more preferably mixed at the mass ratio of 70:30 to 90:10, because excellent ionic conductivity of a produced composite solid electrolyte is obtained.

A duration of the heating is not particularly limited, and may be appropriately selected depending on the intended purpose.

The disclosed composite solid electrolyte can solve the aforementioned various problems in the art, achieve the aforementioned object, and can provide a solid electrolyte, which excels in safety and reliability, can be produced at a low temperature, and has high lithium ion conductivity.

All Solid Battery

The disclosed all solid battery includes at least a cathode active material layer, an anode active material layer, and a solid electrolyte layer, and may further include other members according to the necessity.

Cathode Active Material Layer

The cathode active material layer is not particularly limited, and may be appropriately selected depending on the intended purpose, except that the cathode active material layer is a layer containing a cathode active material.

The cathode active material layer may be the cathode active material itself.

The cathode active material is not particularly limited, and may be appropriately selected depending on the intended purpose. Examples of the cathode active material include lithium-containing composite oxides. The lithium-containing composite oxide is not particularly limited, and may be appropriately selected depending on the intended purpose, except that the lithium-containing composite oxide is a composite oxide containing lithium and another metal. Examples of the lithium-containing composite oxide include $LiCoO_2$, $LiNiO_2$, $LiCrO_2$, $LiVO_2$, $LiM_xMn_{2-x}O_4$ (M is at least one selected from the group consisting of Co, Ni, Fe, Cr, and Cu, $0 \leq x < 2$), $LiFePO_4$, and $LiCoPO_4$.

These materials may be used alone or in combination.

The average thickness of the cathode active material layer is not particularly limited, and may be appropriately selected depending on the intended purpose, but the average thickness is preferably 10 μm or less, more preferably 10 nm to 1 μm, and particularly preferably 50 nm to 200 nm.

A formation method of the cathode active material layer is not particularly limited, and may be appropriately selected depending on the intended purpose. Examples of the formation method include sputtering using a target material of the cathode active material, and compression molding the cathode active material.

Anode Active Material Layer

The anode active material layer is not particularly limited, and may be appropriately selected depending on the intended purpose, except that the anode active material layer is a layer containing an anode active material.

The anode active material layer may be the anode active material itself.

The anode active material is not particularly limited, and may be appropriately selected depending on the intended purpose. Examples of the anode active material include lithium, lithium-aluminium alloys, amorphous carbon, natural graphite, and artificial graphite.

The average thickness of the anode active material layer is not particularly limited, and may be appropriately selected depending on the intended purpose, but the average thickness is preferably 10 μm or less, more preferably 10 nm to 1 μm, and particularly preferably 50 nm to 200 nm.

A formation method of the anode active material layer is not particularly limited, and may be appropriately selected depending on the intended purpose. Examples of the formation method include sputtering using a target material of the anode active material, and compression-molding the anode active material.

Solid Electrolyte Layer

The solid electrolyte layer is the disclosed composite solid electrolyte in the form of a layer.

The solid electrolyte layer is sandwiched between the cathode active material layer and the anode active material layer.

The average thickness of the solid electrolyte layer is not particularly limited, and may be appropriately selected depending on the intended purpose. The average thickness of the solid electrolyte layer is preferably from 50 nm to 10 μm, more preferably from 200 nm to 2 μm, and particularly preferably from 500 nm to 1,000 nm. The thinner solid electrolyte layer is more advantageous in view of ionic conductivity (e.g., Li ion conductivity), but it is difficult to form a smooth thin solid electrolyte layer. The average thickness of the particularly preferable range is advantageous because both ionic conductivity and moldability can be achieved.

Other Members

The aforementioned other members are not particularly limited, and may be appropriately selected depending on the intended purpose. Examples of the aforementioned other members include a cathode current collector and an anode current collector.

Cathode Current Collector

A shape, size, and structure of the cathode current collector are not particularly limited, and may be appropriately selected depending on the intended purpose.

Examples of a material of the cathode current collector include die steel, stainless steel, aluminium, aluminium alloys, titanium alloys, copper, and nickel.

Anode Current Collector

A shape, size and structure of the anode current collector are not particularly limited, and may be appropriately selected depending on the intended purpose.

Examples of a material of the anode current collector include die steel, gold, indium, nickel, copper, and stainless steel.

FIG. 1 is a schematic cross-sectional view illustrating one example of the disclosed all solid battery. In the all solid battery of FIG. 1, the cathode active material layer 2, the solid electrolyte layer 3, the anode active material layer 4, and the anode current collector 5 are laminated on the cathode current collector 1 in this order.

The disclosed all solid battery can solve the aforementioned various problems in the art, achieve the aforementioned object, and can provide an all solid battery, which excels in safety and reliability, can be produced at a low temperature, and can achieve high output.

EXAMPLES

Examples of the disclosed composite solid electrolyte and all solid battery are explained hereinafter, but the disclosed composite solid electrolyte and all solid battery are not limited to the following examples.

Production Example 1

Production of Solid Electrolyte Particles ($Li_{0.33}La_{0.55}TiO_3$)

In Examples and Comparative Examples below, particles produced in the following method by TOSHIMA MANUFACTURING CO., LTD. was used as $Li_{0.33}La_{0.55}TiO_3$ that was solid electrolyte particles.

$La_2O_3$, $Li_2CO_3$, and $TiO_2$ were used as raw materials. The raw materials were weighed in a manner that a molar ratio of the raw materials was matched to a stoichiometric ratio, and were dry mixed by a planetary ball mill using zirconia balls to thereby obtain a mixture. The obtained mixture was fired at 800° C. for 3 hours, followed by at 1,150° C. for 6 hours, to obtain $Li_{0.33}La_{0.55}TiO_3$ (LLTO) that was solid electrolyte particles.

Example 1

Production of Composite Solid Electrolyte

After mixing LLTO produced under the conditions of Production Example 1 and $LiBF_4$ at a mass ratio (LLTO: $LiBF_4$) of 80:20 in an agate mortar, a resulting mixture was compression-molded to obtain a compression-molded product. The obtained compression-molded product was heat-treated at 300° C. for 1 hour in a dry argon (Ar) atmosphere to obtain a sintered body (composite solid electrolyte) having a diameter of 10 mm and a thickness of 1 mm.

Comparative Example 1

Production of Solid Electrolyte of Single LLTO

LLTO produced under the conditions of Production Example 1 was compression-molded to obtain a compression-molded product. The obtained compression-molded product was heat-treated at 300° C. for 1 hour in a dry argon (Ar) atmosphere to obtain a sintered body (composite solid electrolyte) having a diameter of 10 mm and a thickness of 1 mm.

Evaluation

Ionic Conductivity

Electrodes were placed on both surfaces of the solid electrolyte or the composite solid electrolyte, and AC voltage of 10 mV was applied in a range of 1M-0.1 Hz by means of an AC impedance device (available from Metrohm Autolab, product name: AUTOLAB PGSTAT30) to observe a response of electric current with resistance to thereby obtain a Cole-Cole plot. A resistance value (R) was determined from a semi-circle of the obtained Cole-Cole plot, and an ionic conductivity ($\sigma$) was calculated from the thickness (t) and area (s) of the sintered body.

$$\sigma(S/cm) = t\ (cm)/R\ (\Omega)/s(cm^2)\ *Siemens: S=1/\Omega$$

The ionic conductivity was measured at room temperature (25° C.), 50° C., and 80° C. The temperature dependency of the ionic conductivity is depicted in FIG. 2 as Arrhenium plot.

Figure 2:
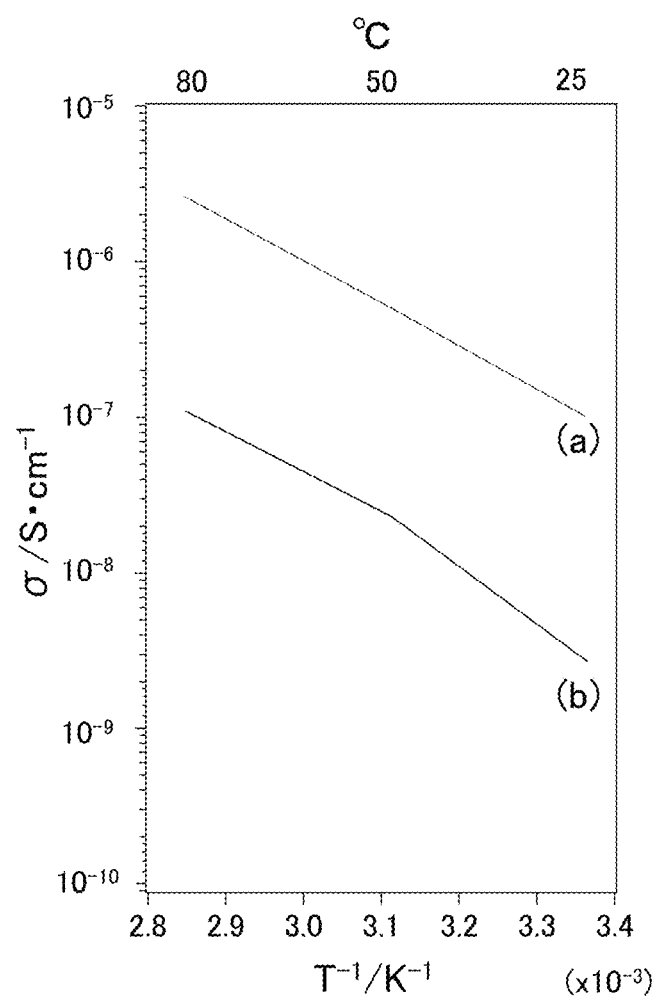
FIG. 2 is a graph depicting the ionic conductivity of the composite solid electrolyte (a) of Example 1 and the ionic conductivity of the solid electrolyte (b) of Comparative Example 1.

The line (a) in FIG. 2 depicts the ionic conductivity of the composite solid electrolyte of Example 1.

The line (b) in FIG. 2 depicts the ionic conductivity of the solid electrolyte of Comparative Example 1.

It could be confirmed from the results of FIG. 2 that the ionic conductivity of the composite solid electrolyte of Example 1 improved about 2 digits (about 100 times) compared to the solid electrolyte of single LLTO of Comparative Example 1.

Scanning Electron Microscopic Photograph

Figure 3:
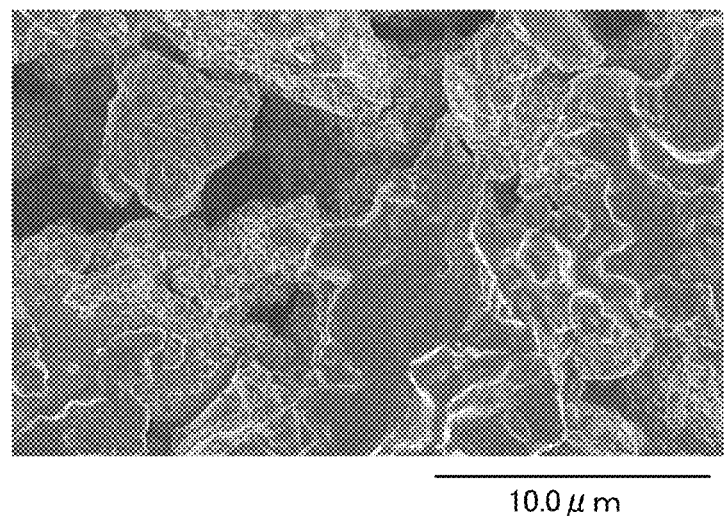
FIG. 3 is a scanning electron microscopic (SEM) photograph of the composite solid electrolyte of Example 1.

A scanning electron microscopic photograph of the composite solid electrolyte of Example 1 is depicted in FIG. 3. Note that, the scanning electron microscopes photographs were taken by ULTRA55 (SEM) available from Carl Zeiss.

It could be confirmed from FIG. 3 that interfaces between the LLTO particles were unclear.

Powder X-Ray Diffraction Spectroscopy

Figure 4:
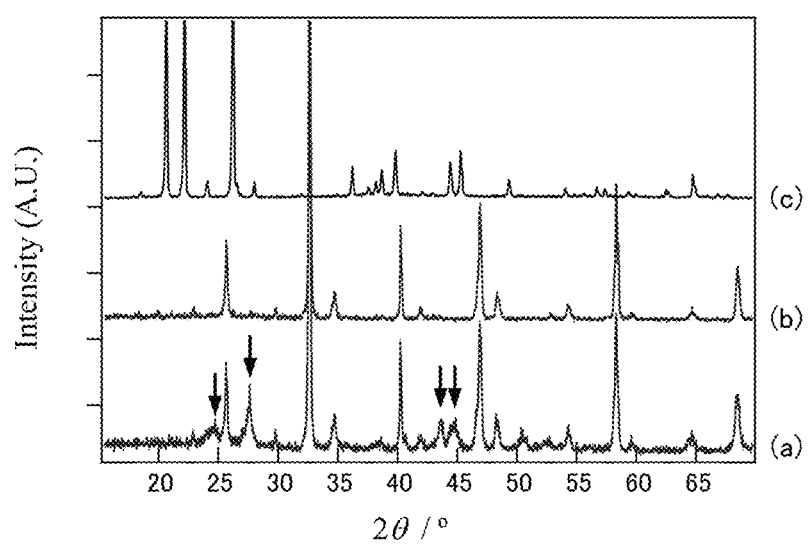
FIG. 4 is a measurement result of powder X-ray diffraction of the composite solid electrolyte of Example 1.

Continuous measurements were carried out by means of RAD-C available from Rigaku Corporation under the conditions that the copper radiation source tube voltage was 40 kV, the tube current was 30 mA, the measuring range was $10° \leq 2\theta \leq 70°$, and the scanning speed was 1.2°/min to obtain diffraction patterns of FIG. 4.

In FIG. 4, (*a*) is an X-ray diffraction pattern of the composite solid electrolyte of Example 1.

In FIG. 4, (*b*) is an X-ray diffraction pattern of the solid electrolyte of Comparative Example 1.

In FIG. 4, (*c*) is an X-ray diffraction pattern of single $LiBF_4$.

With (a) of FIG. 4, the following peaks derived from $LaF_3$, which had not been observed with (b), were confirmed at the positions indicated with the arrows.

2$\theta$ (hkl index plane)=

24.14° (002), 24.73° (110), 27.57° (111),
43.55° (300),
44.65° (113)

SEM-EDX

Figure 5A:
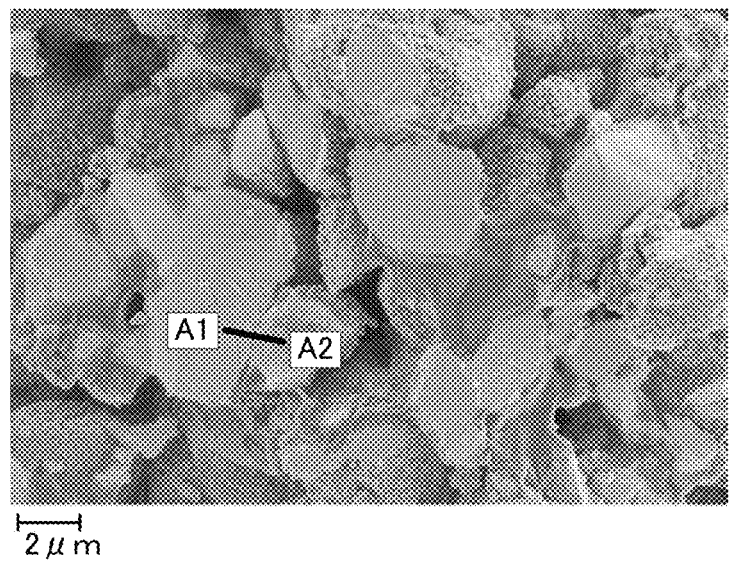
FIG. 5A is an analysis result (SEM photograph) of SEM-EDX of the composite solid electrolyte of Example 1.
Figure 5B:
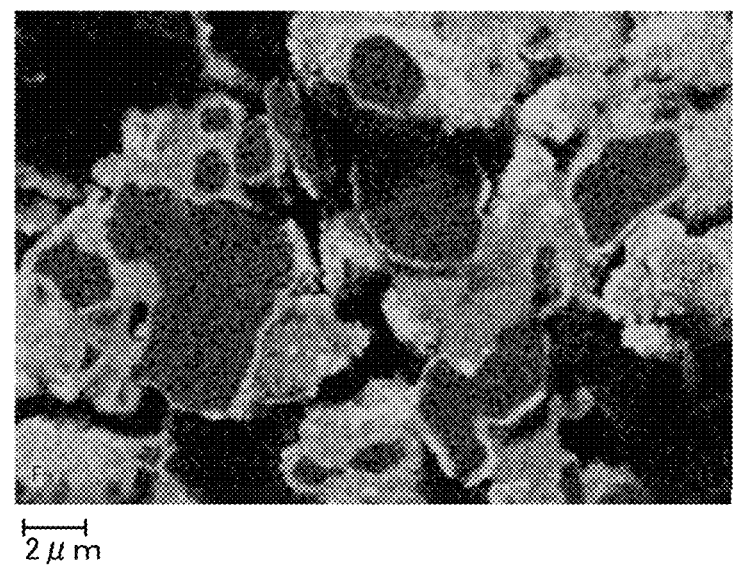
FIG. 5B is a measurement result of a fluorine (F) distribution in the SEM photograph of FIG. 5A.
Figure 5C:
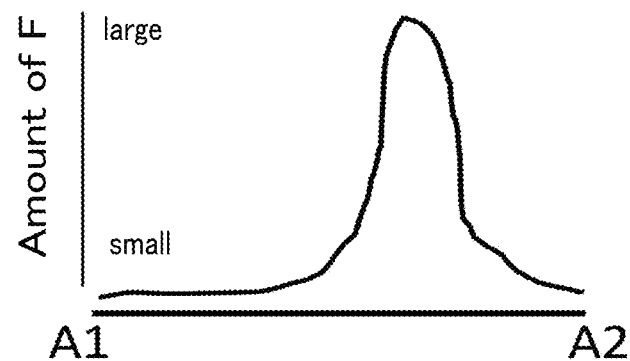
FIG. 5C is a schematic diagram of a fluorine (F) amount of the A1-A2 line in the SEM photograph of FIG. 5A.

Mapping of fluorine was performed on the composite solid electrolyte obtained in Example 1 by means of a scanning electron microscope (SEM) and an energy dispersive X-ray detector (EDX) attached to the SEM. The results are depicted in FIGS. 5A, 5B, and 5C. As the energy dispersive X-ray detector, QUATAX400 available from BRUKER was used.

FIG. 5A is a SEM photograph of a cross-section of the composite solid electrolyte.

FIG. 5B is a result of a fluorine (F) distribution measurement in the SEM photograph of FIG. 5A. In FIG. 5B, the cross-sections of the LLTO particles were indicated with a dark color (black), and the presence of fluorine (F) was not confirmed on the cross-sections of the LLTO particles. On the other hand, surfaces of the LLTO particles were indicated with a pale color (white), and the presence of fluorine (F) was confirmed at a high concentration on the surfaces of the LLTO particles.

FIG. 5C is a schematic diagram depicting an amount of fluorine (F) at the A1-A2 line of FIG. 5A. It was confirmed that a large amount of fluorine (F) was distributed at interfaces between the LLTO particles.

XPS

X-ray photoelectron spectroscopy (XPS) was performed to confirm a change of a 2p orbital of Ti of the composite solid electrolyte obtained in Example 1. The measurement was performed by means of Theta Probe available from Thermo SCIENTIFIC. The measurement conditions were as follows. The result is presented in FIG. 6.

Measurement conditions:

X-ray for use: AlKα, 15 kV, 7.5 mA,

Beam irradiation width: 400 μm

Figure 6:
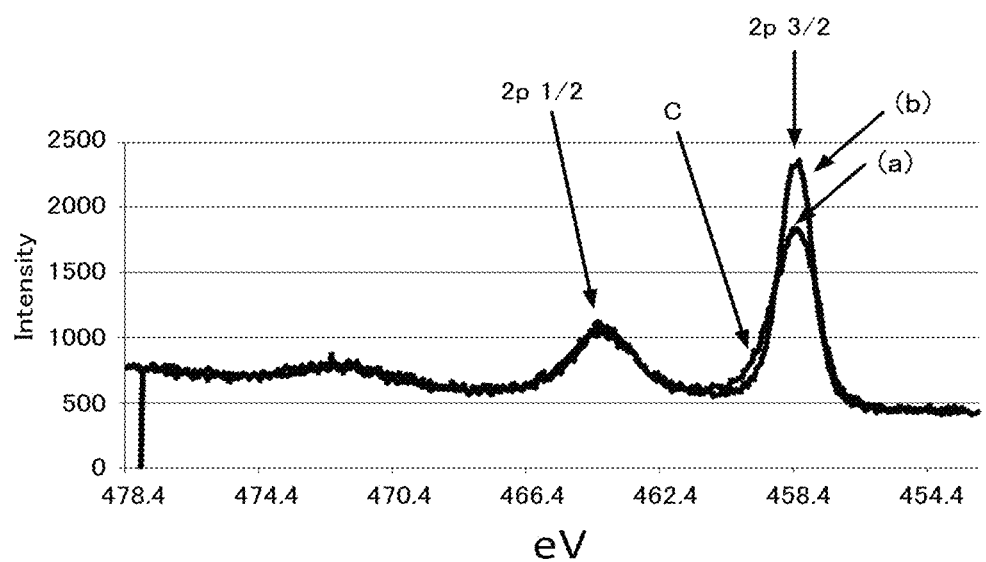
FIG. 6 is an analysis result of XPS of the composite solid electrolyte of Example 1.

In FIG. 6, (a) depicts the measurement result of the composite solid electrolyte of Example 1.

In FIG. 6, (b) depicts the measurement result of the LLTO particles.

It was found from FIG. 6 that a shoulder was generated at a position indicated with the arrow C in the FIG. 6 at the high energy side of the 2p3/2 peak of the composite solid electrolyte of Example 1. This indicated that there was a change in the 2p orbital of Ti, and part of oxygen bonded to Ti was substituted with fluorine.

It was confirmed from the analysis results above that a plurality of the LLTO particles were connected via the solid electrolyte containing $LaF_3$ in the composite solid electrolyte obtained in Example 1. The solid electrolyte was a solid solution of $LaF_3$ and LiF. Moreover, part of oxygen bonded to Ti was substituted with fluorine in the LLTO at the boundary region between the solid electrolyte and the LLTO particle.

Example 2

Production of All Solid Battery

An all solid battery was produced by the following method.

A metal In (the average thickness: 0.1 mm) serving as an anode active material layer was pressure-bonded on an anode current collector (SKD11: die steel) having a diameter of 10 mm.

Subsequently, $LiClO_4$ (100 mg) serving as a solid electrolyte-anode shielding layer was pressed on the anode active material layer with pressure of 1 ton.

Subsequently, 50 mg of the composite solid electrolyte obtained in Example 1 was pressed on the solid electrolyte-anode shielding layer with pressure of 1 ton.

Subsequently, 10 mg of a cathode active material prepared by mixing $LiClO_4$ and $LiCoO_2$ at a mass ratio ($LiClO_4$:$LiCoO_2$) of 4:6 was placed on the composite solid electrolyte. Moreover, a cathode current collector (SKD11: die steel) was placed on the cathode active material, and pressed with pressure of 1 ton to thereby obtain an all solid battery.

Figure 7:
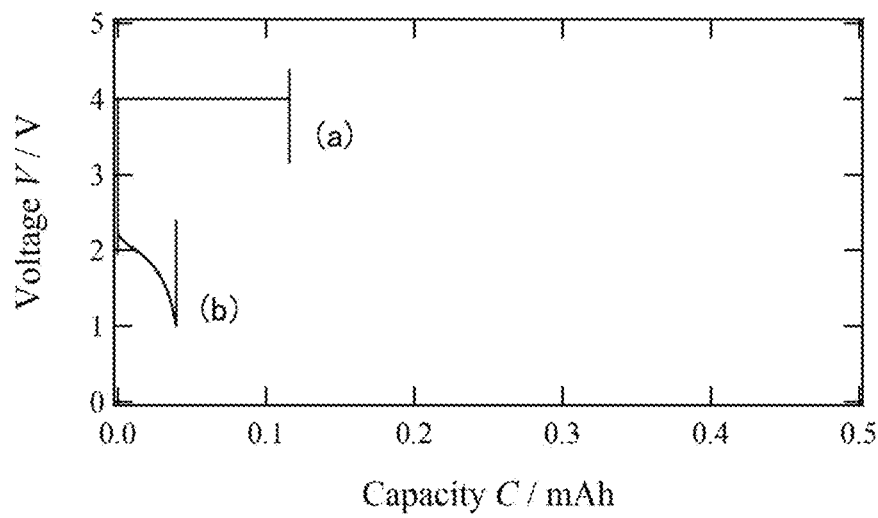
FIG. 7 is a charging-discharging measurement result of the all solid battery of Example 2.

The obtained all solid battery was placed in the environment where the temperature was 80° C. and the relative humidity was 60%, and a charging-discharging test was performed under the following conditions. The result is presented in FIG. 7. In FIG. 7, (a) is a charging curve and (b) is a discharging curve.

Charging was performed at 20 μA maximum with final voltage of 4 V.

Discharging was performed at 2.0 μA maximum with final voltage of 2 V.

It could be confirmed from the result of FIG. 7 that the excellent charging and discharging could be performed.

Comparative Example 2

LLTO produced under the conditions of Production Example 1 and $LiBF_4$ were mechanically mixed (400 rpm, 4 hours) at a mass ratio (LLTO:$LiBF_4$) of 10:1. Ball mill (P-7, available from Fritsch) was used for the mechanical mixing to thereby obtain a composite solid electrolyte.

The obtained composite solid electrolyte was compression-molded into a shape having a diameter of 10 mm and a thickness of 0.5 mm to thereby obtain a compression-molded product.

Ionic conductivity of the obtained compression-molded product was measured in the same method as described above. The results are presented in FIGS. 8A and 8B.

Figure 8A:
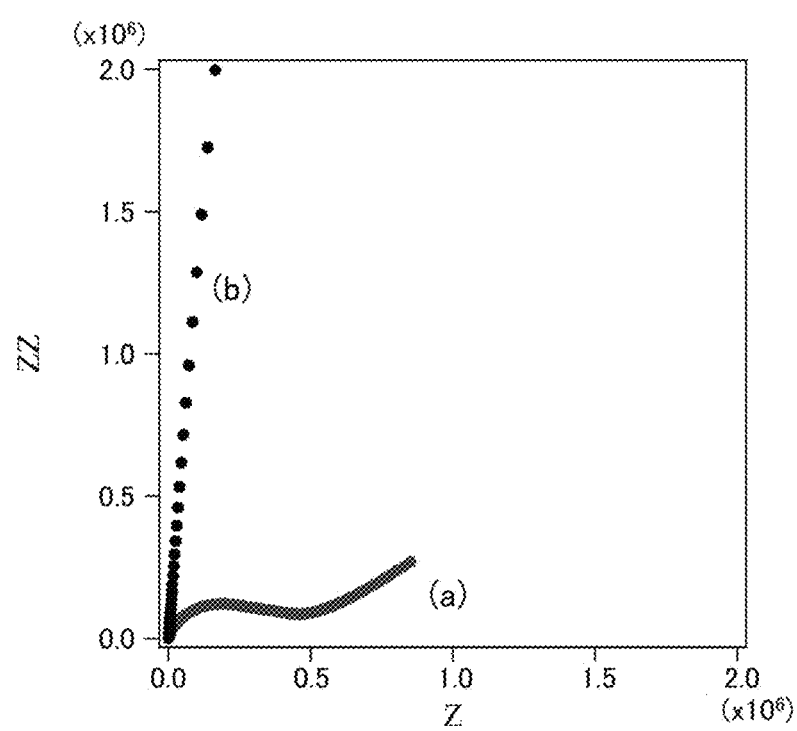
FIG. 8A is Cole-Cole plots of the composite solid electrolyte (a) of Example 1 and the solid electrolyte (b) of Comparative Example 2.
Figure 8B:
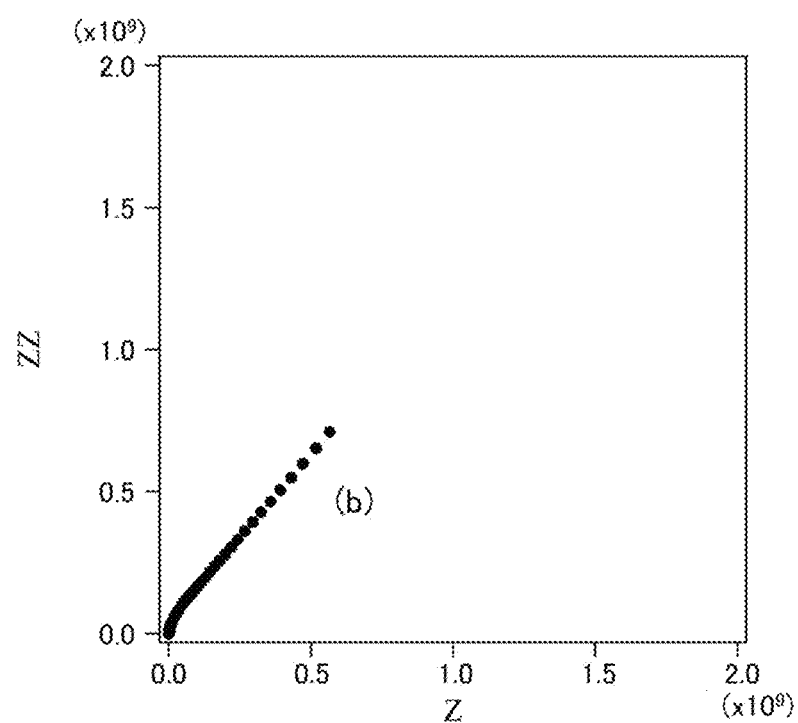
FIG. 8B is a Cole-Cole plot of the solid electrolyte (b) of Comparative Example 2.

In FIGS. 8A and 8B, (b) is the Cole-Cole plot of the composite solid electrolyte of Comparative Example 2. The ionic conductivity determined from the semi-circle formed from the Cole-Cole plot of FIG. 8B was $0.4 \times 10^{-9}$ (S/cm).

In FIG. 8A, (a) is the Cole-Cole plot of the composite solid electrolyte of Example 1. The ionic conductivity determined from the semi-circle formed from the Cole-Cole plot of FIG. 8A was $0.4 \times 10^{-6}$ (S/cm).

It was confirmed from the results above that the disclosed composite solid electrolyte had excellent ionic conductivity compared to the composite solid electrolyte prepared by mechanically mixing LLTO and $LiBF_4$.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the sprit and scope of the invention.

What is claimed is:

1. A composite solid electrolyte comprising:
a solid electrolyte containing $LaF_3$; and
solid electrolyte particles, which are either $Li_{3x}La_{2/3-x}TiO_3$ ($0 \leq x \leq 1/6$) or $Li_7La_3Zr_2O_{12}$ connected via the solid electrolyte.

2. The composite solid electrolyte according to claim 1, wherein the solid electrolyte is a solid solution of $LaF_3$ and LiF.

3. The composite solid electrolyte according to claim 1, wherein a material of the solid electrolyte particles is $Li_{0.33}La_{0.55}TiO_3$.

4. The composite solid electrolyte according to claim 2, wherein a material of the solid electrolyte particles is $Li_{0.33}La_{0.55}TiO_3$.

5. An all solid battery comprising:
a cathode active material layer;
an anode active material layer; and
a solid electrolyte layer sandwiched between the cathode active material layer and the anode active material layer,
wherein the solid electrolyte layer is the composite solid electrolyte according to claim 1 in the form of a layer.

* * * * *